US012531006B2

(12) United States Patent

Chen et al.

(10) Patent No.: US 12,531,006 B2

(45) Date of Patent: Jan. 20, 2026

(54) LED DISPLAY SYSTEM AND DISPLAY CONTROL METHOD THEREOF

(71) Applicant: HANGZHOU SHIXIN TECHNOLOGY CO., LTD, Hangzhou (CN)

(72) Inventors: Riyi Chen, Hangzhou (CN); Liang Wang, Hangzhou (CN); Chengyue Jiao, Hangzhou (CN)

(73) Assignee: HANGZHOU SHIXIN TECHNOLOGY CO., LTD, Hangzhou (CN)

( * ) Notice: Subject to any disclaimer, the term of this patent is extended or adjusted under 35 U.S.C. 154(b) by 377 days.

(21) Appl. No.: 18/263,187

(22) PCT Filed: Mar. 25, 2022

(86) PCT No.: PCT/CN2022/083000

§ 371 (c)(1),
(2) Date: Jul. 27, 2023

(87) PCT Pub. No.: WO2022/222685

PCT Pub. Date: Oct. 27, 2022

(65) Prior Publication Data

US 2024/0087499 A1 Mar. 14, 2024

(30) Foreign Application Priority Data

Apr. 23, 2021 (CN) ......................... 202110443284.1

(51) Int. Cl.
*G09G 3/20* (2006.01)
*G09G 3/32* (2016.01)

(52) U.S. Cl.
CPC ......... *G09G 3/2096* (2013.01); *G09G 3/2007* (2013.01); *G09G 3/32* (2013.01); *G09G 2320/0276* (2013.01)

(58) Field of Classification Search
CPC ...... G09G 3/2096; G09G 3/2007; G09G 3/32; G09G 2320/0276
(Continued)

(56) References Cited

U.S. PATENT DOCUMENTS 7,403,182 B2 7/2008 Lee
7,612,751 B2 11/2009 Lee
(Continued)

FOREIGN PATENT DOCUMENTS

CN 1549996 A 11/2004
CN 1879383 A 12/2006
(Continued)

OTHER PUBLICATIONS

International Search Report (including English translation) and Written Opinion for International Application No. PCT/CN2022/083000, dated Jun. 9, 2022, 10 pages.
(Continued)

*Primary Examiner* — Allen H Nguyen
(74) *Attorney, Agent, or Firm* — Westman, Champlin & Koehler, P.A.

(57) ABSTRACT

Disclosed is a display control method of an LED display system comprising a control terminal and a plurality of cascaded LED module groups each of which comprises a plurality of stages of LED modules connected in cascade, wherein the display control method comprises: performing a gamma correction on display data with an initial bit width to obtain gray scale data with a first bit width; compressing the gray scale data to obtain compressed data with a second bit width; sending the compressed data to a corresponding cascaded LED module group. Further disclosed is an LED display system, which can reduce the bit width of the display data transmitted between the control terminal and the plurality of cascaded LED module groups, so as to drive more
(Continued)

LED modules under the same bandwidth, and increase the display screen area that can be loaded by communication.

17 Claims, 3 Drawing Sheets

(58) Field of Classification Search
USPC .......................................................... 382/166
See application file for complete search history.

(56) References Cited

U.S. PATENT DOCUMENTS

| | | | | |
|---|---|---|---|---|
| 8,406,517 | B2 * | 3/2013 | Ichikawa | H04N 19/186 382/166 |
| 8,451,200 | B2 | 5/2013 | Ohashi et al. | |
| 8,635,358 | B2 | 1/2014 | Anderson et al. | |
| 8,719,334 | B2 | 5/2014 | Anderson et al. | |
| 11,501,689 | B2 | 11/2022 | Jiao et al. | |
| 2003/0222839 | A1 | 12/2003 | Lee | |
| 2005/0120079 | A1 | 6/2005 | Anderson et al. | |
| 2007/0001952 | A1 | 1/2007 | Lee | |
| 2008/0068396 | A1 * | 3/2008 | Ishii | G09G 3/3611 345/601 |
| 2008/0136763 | A1 | 6/2008 | Ohashi et al. | |
| 2010/0309185 | A1 * | 12/2010 | Koester | G09G 3/32 345/82 |
| 2011/0022719 | A1 | 1/2011 | Anderson et al. | |
| 2018/0151105 | A1 | 5/2018 | An et al. | |
| 2022/0020309 | A1 | 1/2022 | Jiao et al. | |
| 2023/0090936 | A1 * | 3/2023 | Zhang | G09G 3/36 345/690 |
| 2023/0106250 | A1 | 4/2023 | Zhang et al. | |

FOREIGN PATENT DOCUMENTS

| | | | |
|---|---|---|---|
| CN | 101202830 | A | 6/2008 |
| CN | 103019656 | A | 4/2013 |
| CN | 203386459 | U | 1/2014 |
| CN | 105847479 | A | 8/2016 |
| CN | 106373516 | A | 2/2017 |
| CN | 109599054 | A | 4/2019 |
| CN | 111415630 | A | 7/2020 |
| CN | 106991959 | B | 8/2020 |
| CN | 111739462 | A | 10/2020 |
| CN | 112367522 | A | 2/2021 |
| CN | 112863432 | A | 5/2021 |
| CN | 112802427 | B | 8/2021 |
| KR | 100687080 | B1 | 2/2007 |
| WO | 2022222685 | A1 | 10/2022 |

OTHER PUBLICATIONS

First Office Action, including Search Report, for Chinese Patent Application No. 202110443284.1, dated Jun. 3, 2021, 14 pages.

Second Office Action, including Search Report, for Chinese Patent Application No. 202110443284.1, dated Jul. 1, 2021, 12 pages.

* cited by examiner

LED DISPLAY SYSTEM AND DISPLAY CONTROL METHOD THEREOF

CROSS-REFERENCE TO RELATED APPLICATIONS

The present application claims the priority of Chinese Patent Application No. 202110443284.1, filed on Apr. 23, 2021 and entitled by "LED DISPLAY SYSTEM AND DISPLAY CONTROL METHOD THEREOF", which is incorporated herein by reference in its entirety.

FIELD OF TECHNOLOGY

The present disclosure relates to a technical field of LED display, in particular to an LED display system and a display control method of the LED display system.

BACKGROUND

An LED display system is widely used to display texts and images. The LED display system includes a control terminal and an LED display screen. An LED module (also known as a unit board) is a major component that makes up the LED display screen, corresponding to a display area of the LED display screen. The LED module can be used individually, or a plurality of LED modules can be cascaded into a group to extend the display area of the LED display screen.

The control terminal has a plurality of communication output ports. In the case where the LED display screen comprises a plurality of cascaded LED module groups, the control terminal can provide a plurality of gray scale data, each of which is used to control a corresponding one of the plurality of cascaded LED module groups. An expandable display screen can be formed using the plurality of cascaded LED module groups.

Each LED module includes an LED array and a plurality of drive circuits connected in series to drive the LED array. In order to improve display performance, a memory unit is arranged in the drive circuit to store the gray scale data. Since a bit width of the gray scale data corresponding to each LED is usually 16 bits, the bit width of the gray scale data transmitted between the control terminal and the plurality of cascaded LED module groups is 16 bits.

When display data is not repeatedly transmitted, a communication bandwidth between the control terminal and one of the plurality of cascaded LED module groups is a product of a display screen area that can be loaded by communication and a bit width of communication data. In the case where the communication bandwidth is determined, the display screen area that can be loaded by communication and the bit width of communication data are inversely proportional. In the prior art, due to the large bit width of the display data transmitted between the control terminal and the plurality of cascaded LED module groups, under the determined communication bandwidth, the display screen area that can be loaded by communication is small, and the number of LED module in each of the plurality of cascaded LED module groups is reduced.

SUMMARY

In view of the above problems, an objective of the present disclosure is to provide an LED display system and a display control method of the LED display system, which can reduce a bit width of display data transmitted between a control terminal and a plurality of cascaded LED module groups, so as to drive more LED modules under the same bandwidth and increase a display screen area that can be loaded by communication.

According to a first aspect of the present disclosure, a display control method of an LED display system is provided, the LED display system includes a control terminal and a plurality of cascaded LED module groups, each of which includes a plurality of stages of LED modules connected in cascade, wherein the display control method comprises: performing a gamma correction on display data to obtain gray scale data by the control terminal, wherein the display data has an initial bit width a, the gray scale data has a first bit width b, which is at least greater than the initial bit width a; compressing the gray scale data to obtain compressed data, wherein the compressed data has a second bit width m, which is smaller than the first bit width b, and greater than or equal to the initial bit width a; sending the compressed data to a corresponding one of the plurality of cascaded LED module groups.

In some embodiments, the display control method further comprises: obtaining and decompressing, by a current stage of the LED modules, the compressed data of the current stage of the LED modules to obtain the gray scale data.

In some embodiments, the display control method further comprises: forwarding, by the current stage of the LED modules, the compressed data of one or more of the LED modules which is cascaded after the current stage of the LED modules to an LED module cascaded next to the current stage of the LED modules.

In some embodiments, the display control method further comprises: lighting up an LED according to the gray scale data by a stage of the LED modules.

In some embodiments, the first bit width b is controlled by a maximum value of the gamma correction, and the maximum value of the gamma correction is variable.

In some embodiments, a value range of the display data is from 0 to $2^a-1$, and a value range of the gray scale data is from 0 to $2^b-1$.

In some embodiments, the step of compressing the gray scale data to obtain the compressed data comprises: constructing a compression algorithm based on the initial bit width a, the first bit width b, and a maximum value of the gamma correction; converting the gray scale data into the compressed data based on the compression algorithm.

In some embodiments, the step of constructing the compression algorithm comprises: selecting $2^m$ values from the value range of the gray scale data; giving numbers to the $2^m$ values from small to large to obtain the numbers y; constructing an array G based on the $2^m$ values and the numbers y.

In some embodiments, the step of converting the gray scale data into the compressed data based on the compression algorithm comprises: performing a lookup in the array G based on a value of the gray scale data, and taking a number y corresponding to the value of the gray scale data as the compressed data.

In some embodiments, the step of selecting the $2^m$ values from the value range of the gray scale data comprises: step 1, selecting $2^a$ values from the value range of the gray scale data; step 2, storing the $2^a$ values in an array B from small to large successively; step 3, determining whether $2^m$ is greater than $2^a$, wherein if $2^m$ is greater than $2^a$, step 4 is continued to perform; if $2^m$ is equal to $2^a$, it means that the selection of the $2^m$ values is finished; step 4, recording the number of the values in the array B as p, setting an initial value of n to be 1, and then performing following steps: step 4.1, determining whether n is equal to p, wherein if n is equal to p, step 4.5 is performed, if n is not equal to p, step 4.2 is performed; step 4.2, determining whether a difference between B[n] and B[n+1] is greater than 1, wherein if the difference between Mill and B[n+1] is greater than 1, an intermediate value (B[n]+B[n+1])/2 is selected and recorded in a temporary array C, if the difference between B[n] and B[n+1] is not more than 1, step 4.3 is performed; step 4.3, comparing "a sum of a current number of values in the array B and a current number of values in the temporary array C" and $2^m$, wherein if "the sum of the current number of values in the array B and the current number of values in the temporary array C" is equal to $2^m$, step 4.5 is performed; if "the sum of the current number of values in the array B and the current number of values in the temporary array C" is not equal to $2^m$, step 4.4 is performed; step 4.4, adding n by 1, and returning to perform step 4.1; step 4.5, sorting the values in the temporary array C and the array B together to get an updated array B, clearing the temporary array C and updating the number p of values in the updated array B; step 4.6, comparing the number p of values in the updated array B and $2^m$, wherein if the number p of values in the updated array B is not equal to $2^m$, n is reset to 1, and step 4.1 is performed again; if the number p of values in the updated array B is equal to $2^m$, it means that the selection of the $2^m$ values is finished.

In some embodiments, the step of decompressing the compressed data comprises: receiving the constructed array G; performing a lookup in the array G based on a value of the compressed data y; converting the compressed data y to obtain the gray scale data G(y).

According to a second aspect of the present disclosure, an LED display system is provided, the LED display system includes a control terminal and a plurality of cascaded LED module groups, each of which includes a plurality of stages of LED modules connected in cascade, wherein, the control terminal is configured to perform a gamma correction on display data to obtain gray scale data, wherein the display data has an initial bit width a, the gray scale data has a first bit width b, which is at least greater than the initial bit width a; compress the gray scale data to obtain compressed data, wherein the compressed data has a second bit width m, which is smaller than the first bit width b, and greater than or equal to the initial bit width a; and send the compressed data to a corresponding one of the plurality of cascaded LED module groups.

In some embodiments, a current stage of the LED modules is configured to obtain and decompress the compressed data of the current stage of the LED modules to obtain the gray scale data.

In some embodiments, the current stage of the LED modules is configured to forward the compressed data of one or more of the LED modules which is cascaded after the current stage of the LED modules to an LED module cascaded next to the current stage of the LED modules.

In some embodiments, the first bit width b is controlled by a maximum value of the gamma correction, and the maximum value of the gamma correction is variable.

In some embodiments, a value range of the display data is from 0 to $2^a-1$, and a value range of the gray scale data is from 0 to $2^b-1$.

In some embodiments, the control terminal comprises a gamma correction module and a data compression module, the gamma correction module is configured to perform the gamma correction on the display data to obtain the gray scale data; the data compression module is configured to compress the gray scale data to obtain the compressed data.

In some embodiments, the data compression module comprises a compression algorithm construction unit and a compression conversion unit, the compression algorithm construction unit is configured to construct a compression algorithm based on the initial bit width a, the first bit width b, and a maximum value of the gamma correction; the compression conversion unit is configured to convert the gray scale data into the compressed data based on the compression algorithm.

In some embodiments, the compression algorithm construction unit comprises: a selection unit for being configured to select $2^m$ values from the value range of the gray scale data; a numbering unit for being configured to give numbers to the $2^m$ values from small to large and record the numbers as y; and an array construction unit for being configured to construct an array G based on the $2^m$ values and the numbers y.

In some embodiments, the compression conversion unit is configured to perform a lookup in the array G based on a value of the gray scale data, and take a number y corresponding to the value of the gray scale data as the compressed data.

In some embodiments, the selection unit is configured to perform: step 1, selecting $2^a$ values from the value range of the gray scale data; step 2, storing the $2^a$ values in an array B from small to large successively; step 3, determining whether $2^m$ is greater than $2^a$, wherein if $2^m$ is greater than $2^a$, step 4 is continued to perform; if $2^m$ is equal to $2^a$, it means that the selection of the $2^m$ values is finished; step 4, recording the number of the values in the array B as p, setting an initial value of n to be 1, and then performing following steps: step 4.1, determining whether n is equal to p, wherein if n is equal to p, step 4.5 is performed, if n is not equal to p, step 4.2 is performed; step 4.2, determining whether a difference between B[n] and B[n+1] is greater than 1, wherein if the difference between B[n] and B[n+1] is greater than 1, an intermediate value (B[n]+B[n+1])/2 is selected and recorded in a temporary array C, if the difference between B[n] and B[n+1] is not more than 1, step 4.3 is performed; step 4.3, comparing "a sum of a current number of values in the array B and a current number of values in the temporary array C" and $2^m$, wherein if "the sum of the current number of values in the array B and the current number of values in the temporary array C" is equal to $2^m$, step 4.5 is performed; if "the sum of the current number of values in the array B and the current number of values in the temporary array C" is not equal to $2^m$, step 4.4 is performed; step 4.4, adding n by 1, and returning to perform step 4.1; step 4.5, sorting the values in the temporary array C and the array B together to get an updated array B, clearing the temporary array C and updating the number p of values in the updated array B; step 4.6, comparing the number p of values in the updated array B and $2^m$, wherein if the number p of values in the updated array B is not equal to $2^m$, n is reset to 1, and step 4.1 is performed again; if the number p of values in the updated array B is equal to $2^m$, it means that the selection of the $2^m$ values is finished.

In some embodiments, the LED module comprises a communication module, a data decompression module, and at least one drive circuit, the communication module is configured to obtain the compressed data of the current stage of the LED modules and forward the compressed data of one or more of the LED modules which is cascaded after the current stage of the LED modules to an LED module cascaded next to the current stage of the LED modules; the data decompression module is configured to decompress the compressed data of the current stage of the LED modules to obtain the gray scale data; each of the at least one drive circuit is configured to generate a drive signal based on the gray scale data to drive an LED array.

In some embodiments, the data decompression module is configured to perform a lookup in the constructed array G based on the received compressed data y, and take a value of G(y) as the gray scale data after performing a conversion.

According to the embodiments of the present disclosure, in the LED display method of the LED display system, the gray scale data with the first bit width obtained by performing the gamma correction is compressed into the compressed data with the second bit width by the control terminal, which is between the initial bit width and the first bit width, and the compressed data is decompressed and restored to the gray scale data with the first bit width by the LED drive circuit, which can reduce the bit width of the display data transmitted between the control terminal and the plurality of cascaded LED module groups, so as to drive more LED modules under the same bandwidth, and increase the display screen area that can be loaded by communication.

BRIEF DESCRIPTION OF THE DRAWINGS

The above and other purposes, features and advantages of the present disclosure will become more apparent through the following description of the embodiments of the present disclosure with reference to the accompanying drawings. Wherein.

DESCRIPTION OF THE EMBODIMENTS

Figure 1:
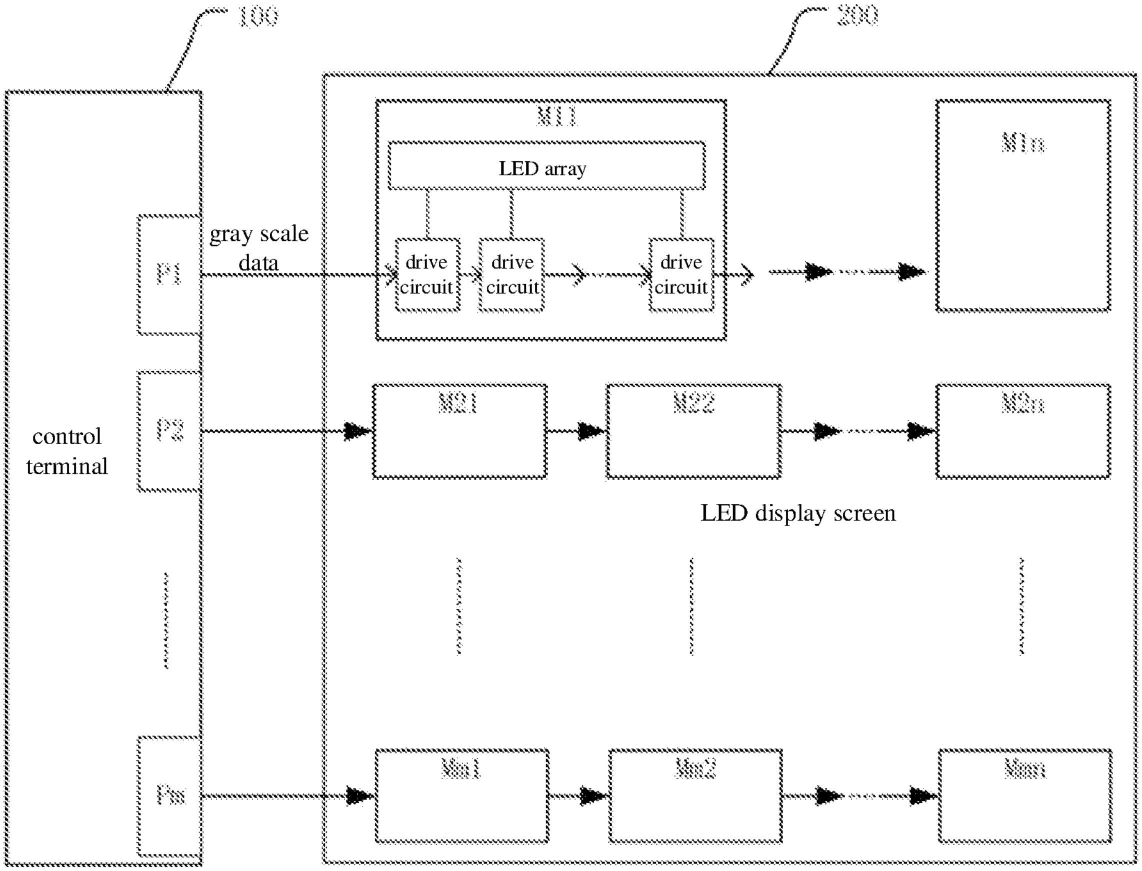
FIG. 1 shows a structural schematic view of an LED display system according to the prior art.

Various embodiments of the present disclosure will be described in more detail below with reference to the accompanying drawings. In each of the accompanying drawings, the same elements are expressed by the same or similar reference numerals. For the sake of clarity, the various parts in the accompanying drawings are not drawn to scale.

The specific embodiments of the present disclosure are further described in detail below in combination with the accompanying drawings and embodiments.

FIG. 1 shows a structural schematic view of an LED display system according to the prior art. The LED display system includes a control terminal 100 and an LED display screen 200, and a plurality of ports (P1-Pm) of the control terminal 100 are connected to the LED display screen 200. The LED display screen 200 includes a plurality of cascaded LED module groups, each of which includes a plurality of stages of LED modules (Mi1-Min, wherein 1≤i≤m) connected in cascade. Each stage of the plurality of stages of LED modules includes at least one drive circuit and an LED array. The at least one drive circuit of each LED module is connected together in series, and a plurality of drive circuits of the plurality of stages of the LED modules connected in cascade are connected together in series.

The control terminal 100 is configured to provide a plurality of gray scale data, each of which controls a corresponding one of the plurality of cascaded LED module groups in the LED display screen 200, that is, the control terminal 100 is configured to provide the plurality of gray scale data to the plurality of cascaded LED module groups respectively.

For a SDR (Standard-Dynamic Range) image, a bit width of display data of a single pixel is 8 bits, that is, the single pixel is used for 256 levels of colors comprising level 0 to level 255. The display data needs to be transformed into gray scale data via a gamma correction, a bit width of which is usually 16 bits.

For a common gamma correction theoretical formula: $f(x)=G\max*(x/255)^{\gamma}$, when a bit width of the display data is 8 bits, a value range of the display data x is from 0 to 255, and a value range of γ is usually from 2.0 to 4.0, and Gmax is a maximum value of the gamma correction. The display data is a digital signal, the calculation result of the gamma correction theoretical formula is usually not an integer, and the first few values of the calculation result of the gamma correction theoretical formula are close to 0, for example, when Gmax=65535, γ=2.8, f (1)=0.0119718, f (2)=0.0833767, therefore, in order to meet the characteristics of the LED display screen digital system and the requirements of image processing, the gamma correction theoretical formula needs to be modified. The modified gamma correction theoretical formula is represented as f'(x), and the function value f'(x) corresponding to each display data is represented using the gray scale data of 16 bits, that is, 256 gray scale data of 16 bits in total are used to represent 256 levels of colors.

Figure 2:
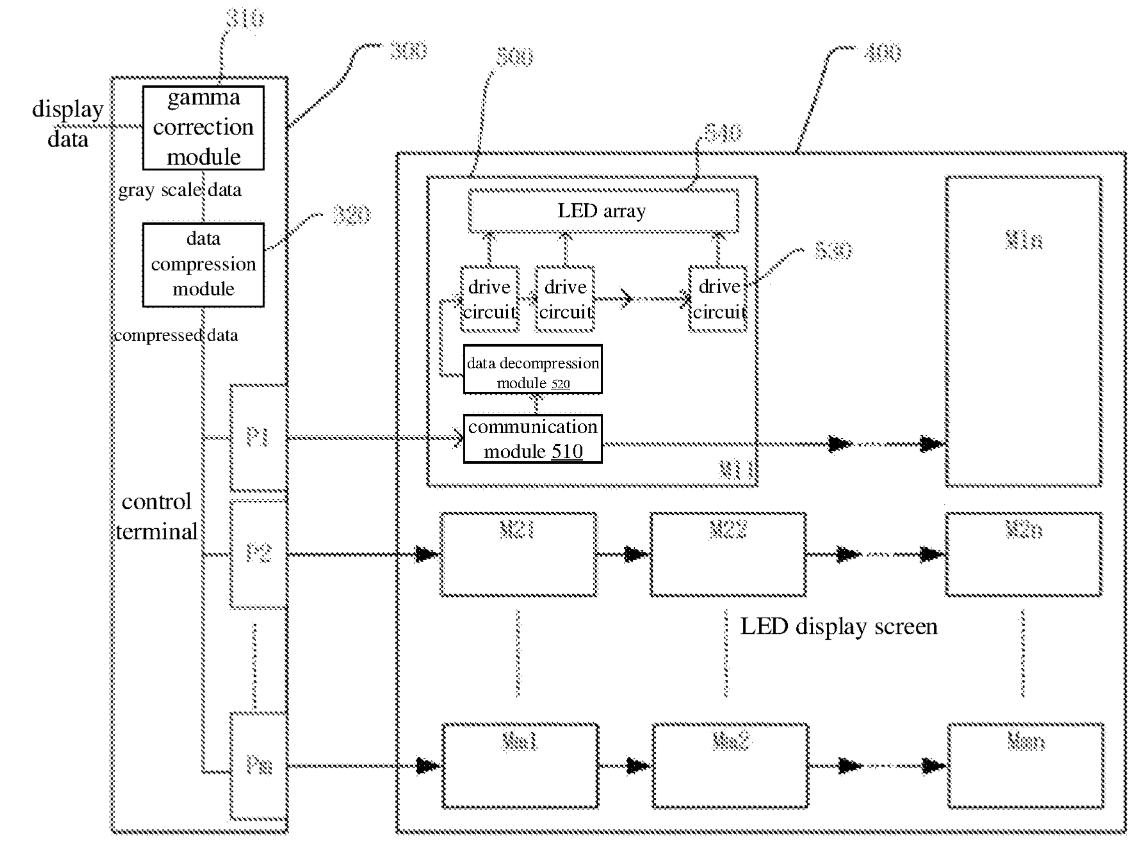
FIG. 2 shows a structural schematic view of an LED display system according to an embodiment of the present disclosure.

FIG. 2 shows a structural schematic view of an LED display system according to an embodiment of the present disclosure. As shown in FIG. 2, the LED display system includes a control terminal 300 and an LED display screen 400, and a plurality of ports (P1-Pm) of the control terminal 300 are connected to the LED display screen 400. The LED display screen 400 includes a plurality of cascaded LED module groups (Mi1-MM, wherein 1≤i≤m), each of which includes a plurality of stages of LED modules 500 connected in cascade.

The control terminal 300 includes a gamma correction module 310 and a data compression module 320, wherein the gamma correction module 310 is configured to perform a gamma correction on the display data to obtain the gray scale data.

In the present embodiment, the display data has an initial bit width a, and the gray scale data has a first bit width b, which is at least greater than the initial bit width a. The first bit width b is controlled by a maximum value Gmax of the gamma correction, which is variable. For example, when Gmax=65535, the corresponding first bit width b is 16 bits. When Gmax=4096, the corresponding first bit width b is 12 bits. A value range of the display data is 0 to $2^a-1$, and a value range of the gray scale data is from 0 to $2^b-1$.

The present embodiment is described by taking the initial bit width a=8 bits and the first bit width b=16 bits as an example, but is not limited to this.

The data compression module 320 is configured to compress the gray scale data to obtain compressed data.

In the present embodiment, the compressed data has a second bit width m, which is smaller than the first bit width b, and greater than or equal to the initial bit width a, i.e., $a\leq m<b$.

Figure 3:
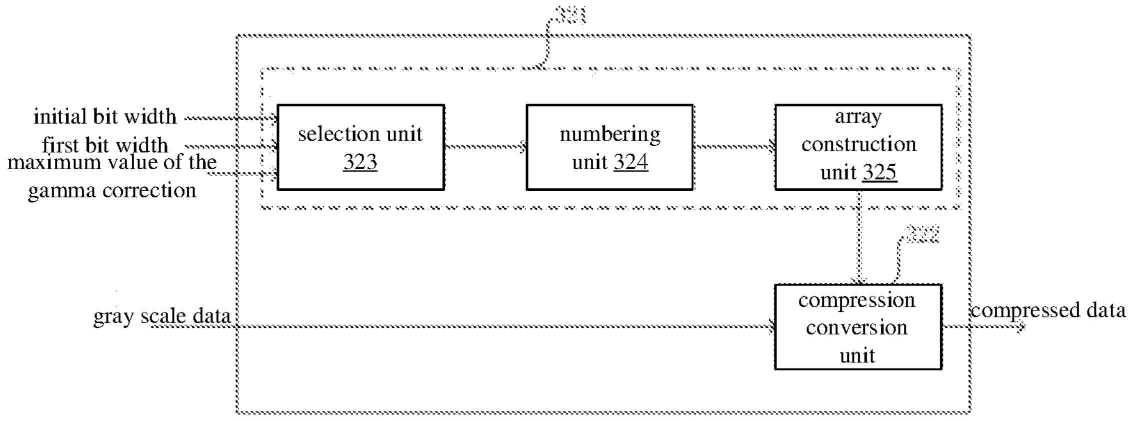
FIG. 3 shows a structural schematic view of a data compression module according to an embodiment of the present disclosure.

FIG. 3 shows a structural schematic view of a data compression module according to an embodiment of the present disclosure. As shown in FIG. 3, the data compression module 320 includes a compression algorithm construction unit 321 and a compression conversion unit 322, wherein the compression algorithm construction unit 321 is configured to construct a compression algorithm based on the initial bit width a, the first bit width b, and the maximum value Gmax of the gamma correction; and the compression conversion unit 322 is configured to convert the gray scale data into the compressed data based on the compression algorithm. The compression algorithm construction unit 321 includes a selection unit 323, a numbering unit 324, and an array construction unit 325. The selection unit 323 is configured to select $2^m$ values from the value range of the gray scale data. The numbering unit 324 is configured to give numbers to the $2^m$ values from small to large, and the numbers are recorded as y. The array construction unit 325 is configured to construct an array G based on the $2^m$ values and the numbers y of the $2^m$ values from small to large. Specifically, the array construction unit 325 is used to store the $2^m$ values in the array G in the order of the numbers y, then each value can be expressed as G(y).

The compression conversion unit 322 is configured to perform a lookup in the array G based on a value of the gray scale data, and take a number y corresponding to the value as the compressed data.

In the present embodiment, a value range of the numbers y of the $2^m$ values from small to large is from 0 to $2^m-1$. Therefore, a bit width of the compressed data y is m bits.

The specific steps for selecting the $2^m$ values from the value range of the gray scale data are as follows, taking f'(255) as an example:

In step 1, in the value range from 0 to 65535 of the gray scale data, values of f'(x) are selected when x is 0, 1, 2, 3 . . . 255, respectively, that is, 256 values comprising f'(0), f'(1), f'(2), f'(3) . . . f'(255) are selected successively.

In step 2, the above 256 values are stored in an array B from small to large successively.

In step 3, whether $2^m$ is greater than 256 is determined, and if $2^m$ is greater than 256, step 4 is continued to perform; if $2^m$ is equal to 256, it means that the selection of the $2^m$ values is finished.

In step 4, the number of the values in the array B is recorded as p, an initial value of n is 1, and then the following steps is performed:

In step 4.1, whether n is equal to p is determined, if n is equal to p, step 4.5 is performed, if n is not equal to p, step 4.2 is performed.

In step 4.2, whether a difference between B[n] and B[n+1] is greater than 1 is determined, if the difference between B[n] and B[n+1] is greater than 1, an intermediate value (B[n]+B[n+1])/2 is selected and recorded in a temporary array C; if the difference between B[n] and B[n+1] is not more than 1, step 4.3 is performed.

In step 4.3, "a sum of a current number of values in the array B and a current number of values in the temporary array C" and $2^m$ is compared, if "the sum of the current number of values in the array B and the current number of values in the temporary array C" is equal to $2^m$, step 4.5 is performed; if "the sum of the current number of values in the array B and the current number of values in the temporary array C" is not equal to $2^m$, step 4.4 is performed.

In step 4.4, n is added by 1, and step 4.1 is performed again.

In step 4.5, the values in the temporary array C and the array B are sorted together to get an updated array B, the temporary array C is cleared, and the number p of values in the updated array B is updated.

In step 4.6, the number p of values in the updated array B and $2^m$ are compared, if the number p of values in the updated array B is not equal to $2^m$, n is reset to 1, and step 4.1 is performed again; if the number p of values in the updated array B is equal to $2^m$, it means that the selection of the $2^m$ values is finished. In the embodiment of the present disclosure, the way to select the $2^m$ values is not limited to this.

Each LED module 500 includes a communication module 510, a data decompression module 520, at least one drive circuit 530, and an LED array 540. The at least one drive circuit 530 of each LED module 500 is connected together in series. The communication modules 510 of the plurality of stages of LED modules 500 are connected together in series.

The communication module 510 is configured to obtain the compressed data of the current stage of the LED modules and forward the compressed data of one or more of the LED modules which is cascaded after the current stage of the LED modules to an LED module cascaded next to the current stage of the LED modules; the data decompression module 520 is configured to decompress the compressed data of the current stage of the LED modules to obtain the gray scale data; the drive circuit 530 is configured to generate a drive signal based on the gray scale data to drive the LED array 540.

In the present embodiment, the data decompression module 520 is configured to receive the constructed array G, and perform a lookup in the array G based on a value of the compressed data y, which is converted to the gray scale data, that is, a value of G(y).

The data decompression module 520 can successively store a list of the $2^m$ values in the array G, for example, the values are stored from small to large. When a decompression is performed, a value of G (y) corresponding to the compressed data y can be obtained by looking up the list.

According to the embodiments of the present disclosure, in the LED display system, the gray scale data with the first bit width obtained by performing the gamma correction is compressed into the compressed data with the second bit width by the control terminal, which is between the initial bit width and the first bit width, and the LED drive circuit decompresses the compressed data and restores the compressed data to the gray scale data with the first bit width, which can reduce the bit width of the display data transmitted between the control terminal and the plurality of cascaded LED module groups, so as to drive more LED modules under the same bandwidth, and increase the display screen area that can be loaded by communication.

Figure 4:
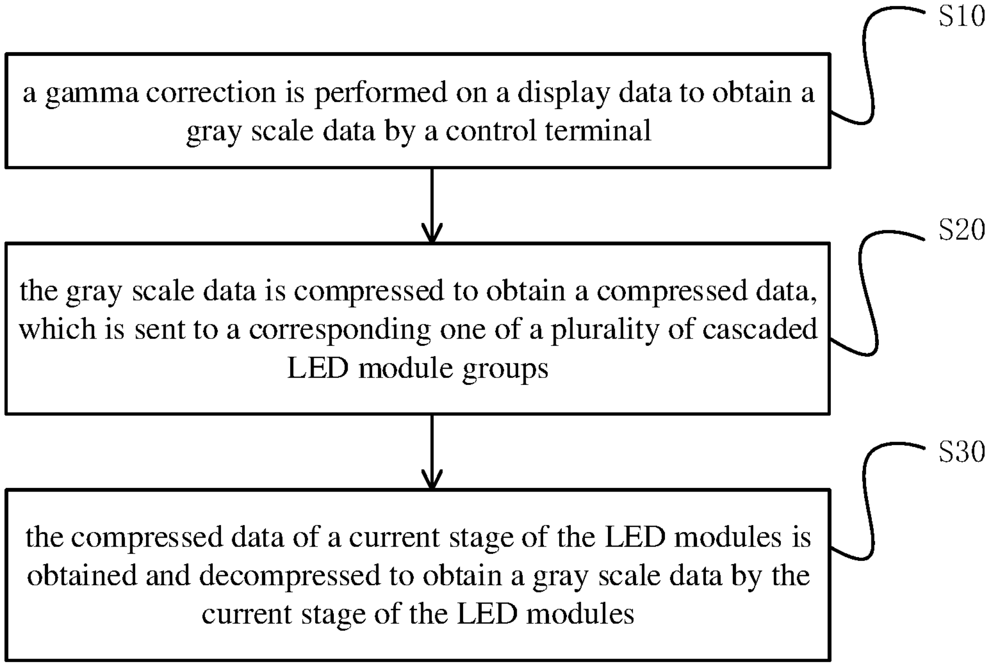
FIG. 4 shows a flowchart of a display control method for an LED display system according to an embodiment of the present disclosure.

FIG. 4 shows a flowchart of a display control method for an LED display system according to an embodiment of the present disclosure. As shown in FIG. 4, the display control method includes the following steps:

In step S10, a gamma correction is performed on display data to obtain gray scale data by a control terminal.

In the present embodiment, the display data has an initial bit width a, the gray scale data has a first bit width b, which is at least greater than the initial bit width a. The first bit width b is controlled by a maximum value Gmax, which is variable, of the gamma correction. For example, when Gmax=65535, the corresponding first bit width b is 16 bits. When Gmax=4096, the corresponding first bit width b is 12 bits. A value range of the display data is from 0 to $2^a-1$, and a value range of the gray scale data is from 0 to $2^b-1$.

The present embodiment is described by taking the initial bit width a=8 bits and the first bit width b=16 bits as an example, but is not limited to this.

In step S20, the gray scale data is compressed to obtain compressed data, which is sent to a corresponding one of a plurality of cascaded LED module groups.

Figure 5:
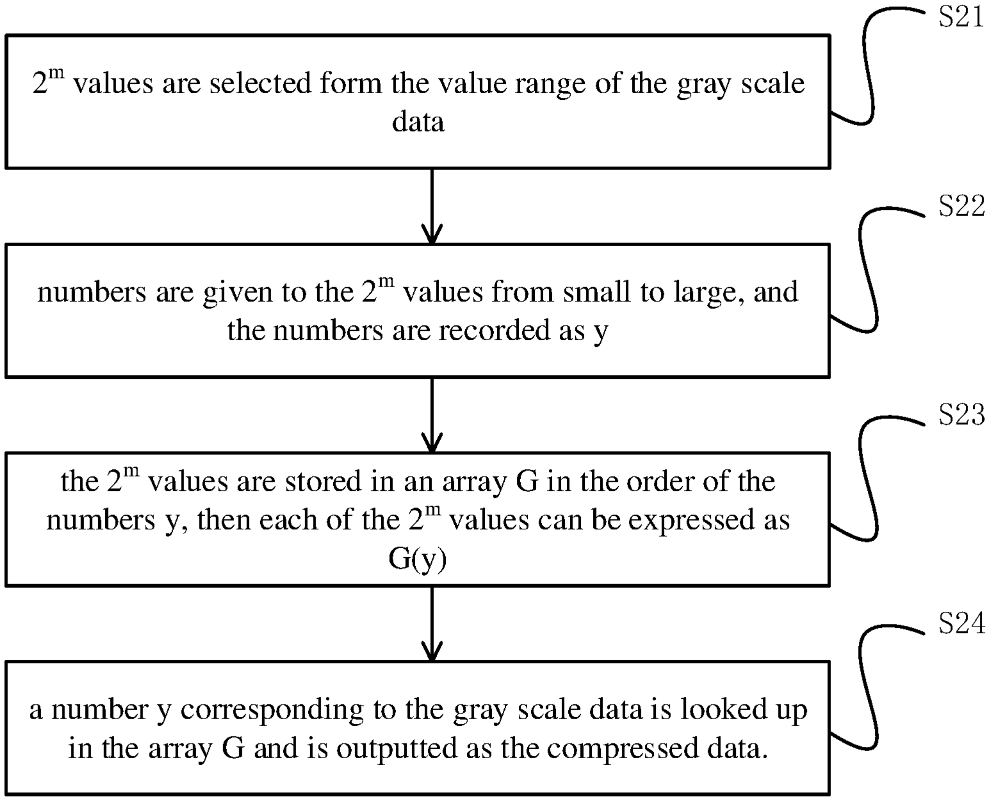
FIG. 5 shows a flowchart of the step S20 in the display control method according to an embodiment of the present disclosure.

FIG. 5 shows a flowchart of the step S20 in the display control method according to an embodiment of the present disclosure. In the present embodiment, as shown in FIG. 5, the step S20 specifically includes a plurality of steps from step S21 to step S24. In step S21, $2^m$ values are selected from the value range of the gray scale data. In step S22, numbers are given to the $2^m$ values from small to large, and the numbers are recorded as y. In step S23, the $2^m$ values are stored in an array G in the order of the numbers y, then each of the $2^m$ values can be expressed as G(y). In step S24, a number y corresponding to the gray scale data is looked up in the array G and is outputted as the compressed data.

In the present embodiment, a value range of the numbers y of the $2^m$ values from small to large is from 0 to $2^m-1$. Therefore, a bit width of the compressed data y is m bits.

The specific steps for selecting the $2^m$ values from the value range of the gray scale data are as follows, taking f'(255) as an example:

In step 1, in the value range from 0 to 65535 of the gray scale data, values of f'(x) are selected when x is 0, 1, 2, 3 . . . 255, respectively, that is, 256 values comprising f'(0), f'(1), f'(2), f'(3) . . . f'(255) are selected successively.

In step 2, the above 256 values are stored in an array B from small to large successively.

In step 3, whether $2^m$ is greater than 256 is determined, and if $2^m$ is greater than 256, step 4 is continued to perform; if $2^m$ is equal to 256, it means that the selection of the $2^m$ values is finished.

In step 4, the number of the values in the array B is recorded as p, an initial value of n is 1, and then the following steps is performed:

In step 4.1, whether n is equal to p is determined, if n is equal to p, step 4.5 is performed, if n is not equal to p, step 4.2 is performed.

In step 4.2, whether a difference between B[n] and B[n+1] is greater than 1 is determined, if the difference between B[n] and B[n+1] is greater than 1, an intermediate value (B[n]+B[n+1])/2 is selected and recorded in a temporary array C; if the difference between B[n] and B[n+1] is not more than 1, step 4.3 is performed.

In step 4.3, "a sum of a current number of values in the array B and a current number of values in the temporary array C" and $2^m$ is compared, if "the sum of the current number of values in the array B and the current number of values in the temporary array C" is equal to $2^m$, step 4.5 is performed; if "the sum of the current number of values in the array B and the current number of values in the temporary array C" is not equal to $2^m$, step 4.4 is performed.

In step 4.4, n is added by 1, and step 4.1 is performed again.

In step 4.5, the values in the temporary array C and the array B are sorted together to get an updated array B, the temporary array C is cleared, and the number p of values in the updated array B is updated.

In step 4.6, the number p of values in the updated array B and $2^m$ are compared, if the number p of values in the updated array B is not equal to $2^m$, n is reset to 1, and step 4.1 is performed again; if the number p of values in the updated array B is equal to $2^m$, it means that the selection of the $2^m$ values is finished. In the embodiment of the present disclosure, the way to select the $2^m$ values is not limited to this.

In step S30, a constructed array G is obtained, and the compressed data of a current stage of the LED modules is decompressed to obtain the gray scale data by the current stage of the LED modules.

In the present embodiment, the LED module converts the compressed data into the gray scale data according to the constructed array G and the value of the compressed data. The LED module can store a list of the $2^m$ values in the array G successively, for example, the values are stored from small to large. When a decompression is performed, the value of G(y) corresponding to the compressed data y can be obtained by looking up the list, that is, the value of G(y) is the gray scale data obtained after performing a decompression.

According to the embodiments of the present disclosure, in the LED display method of the LED display system, the gray scale data with the first bit width obtained by performing the gamma correction is compressed into the compressed data with the second bit width by the control terminal, which is between the initial bit width and the first bit width, and the compressed data is decompressed and restored to the gray scale data with the first bit width by the LED drive circuit, which can reduce the bit width of the display data transmitted between the control terminal and the plurality of cascaded LED module groups, so as to drive more LED modules under the same bandwidth, and increase the display screen area that can be loaded by communication.

According to the embodiments of the present disclosure, as described above, these embodiments do not describe all the details exhaustively, nor do they limit the present disclosure to the specific embodiments. Obviously, according to the above description, many modifications and changes can be made. These embodiments are selected and specifically described in the specification to better explain the principle and practical application of the present disclosure, so that those skilled in the art can make good use of the present disclosure and modify it on the basis of the present disclosure. The present disclosure is limited only by the claims and their full scope and equivalents.

What is claimed is:

1. A display control method of an LED display system comprising a control terminal and a plurality of cascaded LED module groups, each of which comprises a plurality of stages of LED modules connected in cascade, wherein the display control method comprises:

performing a gamma correction on display data to obtain gray scale data by the control terminal, wherein the display data has an initial bit width a, the gray scale data has a first bit width b, which is at least greater than the initial bit width a;

compressing the gray scale data to obtain compressed data, wherein the compressed data has a second bit width m, which is smaller than the first bit width b, and is greater than or equal to the initial bit width a;

sending the compressed data to a corresponding one of the plurality of cascaded LED module groups;

obtaining and decompressing, by a current stage of the LED modules, the compressed data of the current stage of the LED modules to obtain the gray scale data; and forwarding, by the current stage of the LED modules, the compressed data of one or more of the LED modules which is cascaded after the current stage of the LED modules to an LED module cascaded next to the current stage of the LED modules, wherein the first bit width b is controlled by a maximum value of the gamma correction, and the maximum value of the gamma correction is variable.

2. The display control method according to claim 1, wherein the display control method further comprises: lighting up an LED according to the gray scale data by a stage of the LED modules.

3. The display control method according to claim 1, wherein a value range of the display data is from 0 to $2^a-1$, and a value range of the gray scale data is from 0 to $2^b-1$.

4. The display control method according to claim 3, wherein the step of compressing the gray scale data to obtain the compressed data comprises:

constructing a compression algorithm based on the initial bit width a, the first bit width b, and a maximum value of the gamma correction;

converting the gray scale data into the compressed data based on the compression algorithm.

5. The display control method according to claim 4, wherein the step of constructing the compression algorithm comprises:

selecting $2^m$ values from the value range of the gray scale data;

giving numbers to the $2^m$ values from small to large to obtain the numbers y;

constructing an array G based on the $2^m$ values and the numbers y.

6. The display control method according to claim 5, wherein the step of converting the gray scale data into the compressed data based on the compression algorithm comprises:

perform a lookup in the array G based on a value of the gray scale data, and taking a number y corresponding to the value of the gray scale data as the compressed data.

7. The display control method according to claim 5, wherein the step of selecting the $2^m$ values from the value range of the gray scale data comprises:

step 1, selecting $2^a$ values from the value range of the gray scale data;

step 2, storing the $2^a$ values in an array B from small to large successively;

step 3, determining whether $2^m$ is greater than $2^a$, wherein if $2^m$ is greater than $2^a$, step 4 is continued to perform; if $2^m$ is equal to $2^a$, it means that the selection of the $2^m$ values is finished;

step 4, recording the number of the values in the array B as p, setting an initial value of n to be 1, and then performing following steps:

step 4.1, determining whether n is equal to p, wherein if n is equal to p, step 4.5 is performed, if n is not equal to p, step 4.2 is performed;

step 4.2, determining whether a difference between B[n] and B[n+1] is greater than 1, wherein if the difference between B[n] and B[n+1] is greater than 1, an intermediate value (B[n]+B[n+1])/2 is selected and recorded in a temporary array C, if the difference between B[n] and B[n+1] is not more than 1, step 4.3 is performed;

step 4.3, comparing "a sum of a current number of values in the array B and a current number of values in the temporary array C" and $2^m$, wherein if "the sum of the current number of values in the array B and the current number of values in the temporary array C" is equal to $2^m$, step 4.5 is performed; if "the sum of the current number of values in the array B and the current number of values in the temporary array C" is not equal to $2^m$, step 4.4 is performed;

step 4.4, adding n by 1, and returning to perform step 4.1;

step 4.5, sorting the values in the temporary array C and the array B together to get an updated array B, clearing the temporary array C and updating the number p of values in the updated array B;

step 4.6, comparing the number p of values in the updated array B and $2^m$, wherein if the number p of values in the updated array B is not equal to $2^m$, n is reset to 1, and step 4.1 is performed again; if the number p of values in the updated array B is equal to $2^m$, it means that the selection of the $2^m$ values is finished.

8. The display control method according to claim 5, wherein the step of decompressing the compressed data comprises:

receiving the constructed array G;

performing a lookup in the array G based on a value of the compressed data y;

converting the compressed data y to obtain the gray scale data G(y).

9. An LED display system comprising a control terminal and a plurality of cascaded LED module groups, each of which comprises a plurality of stages of LED modules connected in cascade, wherein, the control terminal is configured to:

perform a gamma correction on display data to obtain gray scale data, wherein the display data has an initial bit width a, the gray scale data has a first bit width b, which is at least greater than the initial bit width a;

compress the gray scale data to obtain compressed data, wherein the compressed data has a second bit width m, which is smaller than the first bit width b, and greater than or equal to the initial bit width a;

send the compressed data to a corresponding one of the plurality of cascaded LED module groups;

obtain and decompress the compressed data of the current stage of the LED modules to obtain the gray scale data; and forward the compressed data of one or more of the LED modules which is cascaded after the current stage of the LED modules to an LED module cascaded next to the current stage of the LED modules, wherein the first bit width b is controlled by a maximum value of the gamma correction, and the maximum value of the gamma correction is variable.

10. The LED display system according to claim 9, wherein a value range of the display data is from 0 to $2^a-1$, and a value range of the gray scale data is from 0 to $2^b-1$.

11. The LED display system according to claim 10, wherein the control terminal comprises a gamma correction module and a data compression module, the gamma correction module is configured to perform the gamma correction on the display data to obtain the gray scale data;

the data compression module is configured to compress the gray scale data to obtain the compressed data.

12. The LED display system according to claim 11, wherein the data compression module comprises a compression algorithm construction unit and a compression conversion unit, the compression algorithm construction unit is configured to construct a compression algorithm based on the initial bit width a, the first bit width b, and a maximum value of the gamma correction;

the compression conversion unit is configured to convert the gray scale data into the compressed data based on the compression algorithm.

13. The LED display system according to claim 12, wherein the compression algorithm construction unit comprises:

a selection unit for being configured to select $2^m$ values from the value range of the gray scale data;

a numbering unit for being configured to give numbers to the $2^m$ values from small to large and record the numbers as y;

a array construction unit for being configured to construct an array G based on the $2^m$ values and the numbers y.

14. The LED display system according to claim 13, wherein the compression conversion unit is configured to perform a lookup in the array G based on a value of the gray scale data, and take a number y corresponding to the value of the gray scale data as the compressed data.

15. The LED display system according to claim 13, wherein the selection unit is configured to perform:

step 1, selecting $2^a$ values from the value range of the gray scale data;

step 2, storing the $2^a$ values in an array B from small to large successively;

step 3, determining whether $2^m$ is greater than $2^a$, wherein if $2^m$ is greater than $2^a$, step 4 is continued to perform; if $2^m$ is equal to 2a, it means that the selection of the $2^m$ values is finished;

step 4, recording the number of the values in the array B as p, setting an initial value of n to be 1, and then performing following steps:

step 4.1, determining whether n is equal to p, wherein if n is equal to p, step 4.5 is performed, if n is not equal to p, step 4.2 is performed;

step 4.2, determining whether a difference between B[n] and B[n+1] is greater than 1, wherein if the difference between B[n] and B[n+1] is greater than 1, an intermediate value (B[n]+B[n+1])/2 is selected and recorded in a temporary array C, if the difference between B[n] and B[n+1] is not more than 1, step 4.3 is performed;

step 4.3, comparing "a sum of a current number of values in the array B and a current number of values in the temporary array C" and $2^m$, wherein if "the sum of the current number of values in the array B and the current number of values in the temporary array C" is equal to $2^m$, step 4.5 is performed; if "the sum of the current number of values in the array B and the current number of values in the temporary array C" is not equal to $2^m$, step 4.4 is performed;

step 4.4, adding n by 1, and returning to perform step 4.1;

step 4.5, sorting the values in the temporary array C and the array B together to get an updated array B, clearing the temporary array C and updating the number p of values in the updated array B;

step 4.6, comparing the number p of values in the updated array B and $2^m$, wherein if the number p of values in the updated array B is not equal to $2^m$, n is reset to 1, and step 4.1 is performed again; if the number p of values in the updated array B is equal to $2^m$, it means that the selection of the $2^m$ values is finished.

16. The LED display system according to claim 13, wherein the LED module comprises a communication module, a data decompression module, and at least one drive circuit, the communication module is configured to obtain the compressed data of the current stage of the LED modules and forward the compressed data of one or more of the LED modules which is cascaded after the current stage of the LED modules to an LED module cascaded next to the current stage of the LED modules;

the data decompression module is configured to decompress the compressed data of the current stage of the LED modules to obtain the gray scale data;

each of the at least one drive circuit is configured to generate a drive signal based on the gray scale data to drive an LED array.

17. The LED display system according to claim 16, wherein the data decompression module is configured to perform a lookup in the constructed array G based on the received compressed data y, and take a value of G(y) as the gray scale data after performing a conversion.

* * * * *